June 16, 1953
C. E. BECK
2,642,475
UNIVERSAL HEAD MOUNTING HAVING
A RESILIENT POSITIONING PAD
Filed June 21, 1949
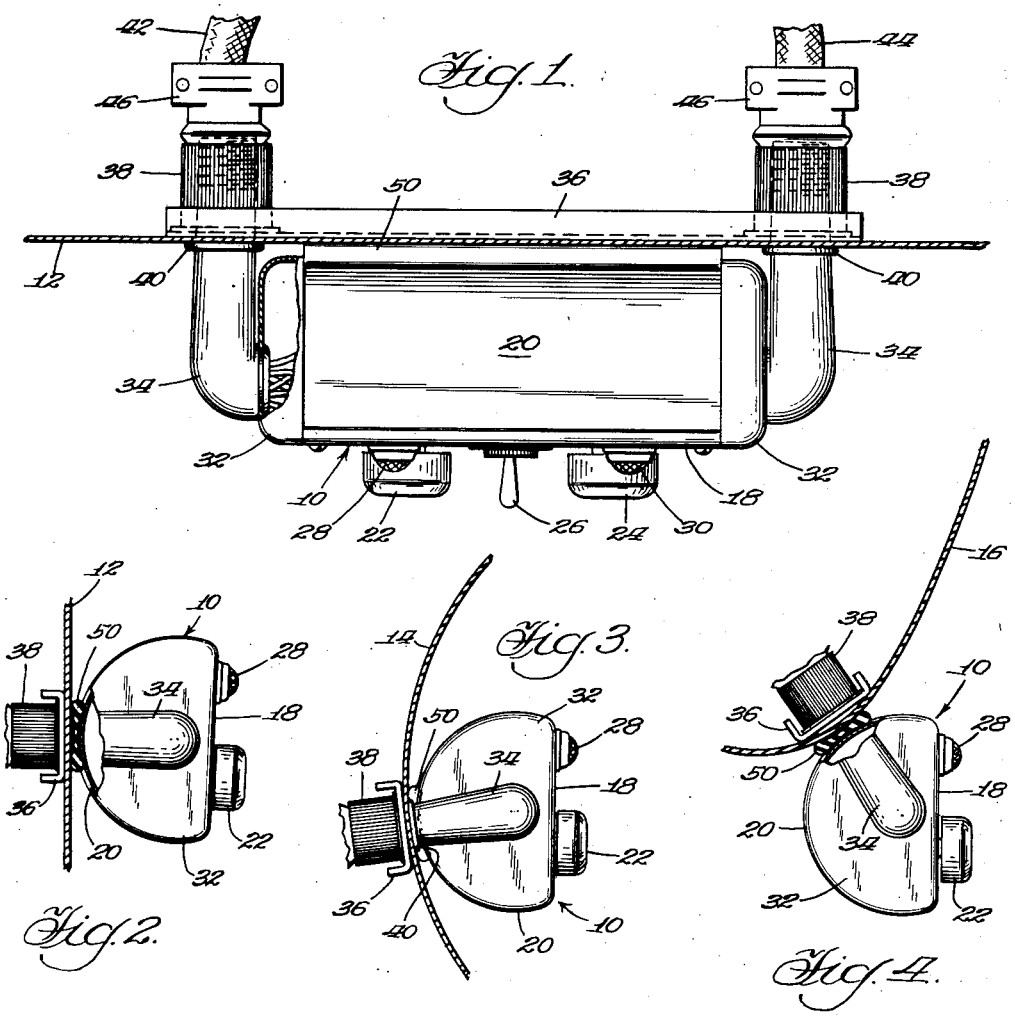
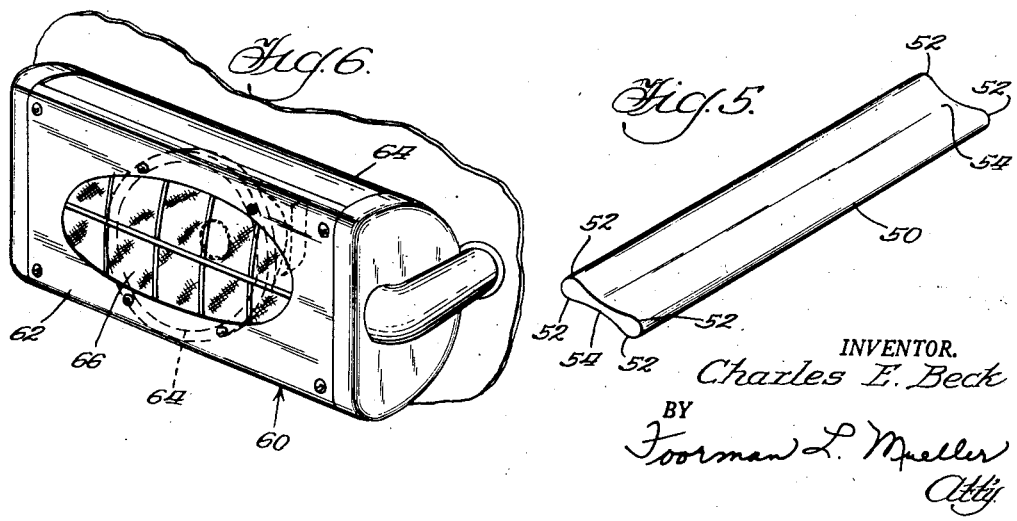
INVENTOR.
Charles E. Beck
BY
Foorman L. Mueller
Atty Patented June 16, 1953

2,642,475

UNITED STATES PATENT OFFICE 2,642,475

UNIVERSAL HEAD MOUNTING HAVING A RESILIENT POSITIONING PAD

Charles E. Beck, Park Ridge, Ill., assignor to Motorola, Inc., Chicago, Ill., a corporation of Illinois Application June 21, 1949, Serial No. 100,455

5 Claims. (Cl. 174—48)

This invention relates to mounting devices and particularly to means for mounting a control head or speaker head upon a supporting wall such as the dash of a motor vehicle.

In the art of mobile radio communication it is customary to mount a control head or speaker head upon a supporting wall, such as the dash of the vehicle, by clamping the head to the exterior of the wall. The head generally is arranged so that it may assume any of several angular positions relative to the wall before it is secured thereto, and the portion of the head which faces the wall is of convex cylindrical configuration to facilitate such positioning of the head. If the convex face of the head bears directly against the supporting wall, both surfaces being smooth and hard, it is difficult sometimes to keep the head from turning to an undesired position when subjected to the usual vibrations and other mechanical stresses which occur in normal usage, even though the head is clamped very tightly to the wall.

An object of the present invention is to provide an improved universal head mounting of simple and economical design to hold the head in any desired position and to prevent turning of the head relative to the supporting wall.

Another object is to provide an improved head mounting which includes a gripping member that is universally adapted for insertion between adjacent surfaces having a wide variety of configurations, such as convex, concave or plane.

A feature of the invention is the provision of a resilient mounting strip having a dumbbell-shaped cross section with enlarged, longitudinal gripping portions at its opposite edges and a relatively thin, longitudinal center portion. The strip is adapted for insertion between the head and the wall, and its configuration is such that the enlarged edge portions thereof afford spaced points of contact with the adjacent surfaces of the head and the supporting wall, whether the radius of curvature of such surfaces be large or small.

The foregoing and other objects, features and advantages of the invention will be understood better from the following description thereof taken in connection with the accompanying drawing, wherein:

Fig. 1 is a horizontal section through a plane supporting wall on which a control head is mounted in accordance with the principles of the invention;

Fig. 2 is a vertical section through the wall, showing in greater detail the novel mounting means associated with the control head;

Figs. 3 and 4 are vertical sectional views similar to Fig. 2, showing the control head mounted upon concave and convex supporting walls;

Fig. 5 is a perspective view of a mounting strip embodying the invention; and

Fig. 6 is a perspective view of a speaker head which may be mounted in the same manner as the control head shown in Figs. 1-4.

In practicing the invention, a control head or speaker head having a cylindrical convex face is disposed in the desired position thereof adjacent a supporting wall (which may be of plane, concave or convex configuration), with the convex face of the head opposed to the wall. A resilient mounting strip is interposed between the wall and the head, and the head is fastened to the wall by suitable clamping means. The mounting strip has a cross-sectional configuration which resembles the shape of a dumbbell, thus providing a pair of spaced, enlarged, gripping shoulder portions separated by an intervening thin section having a concave configuration with a very small radius of curvature on either side of the mounting strip. The opposed faces of the supporting wall and the head have larger radii of curvature than the concave surfaces of the strip, so that the mounting strip has two distinct, spaced points of contact with the adjoining surface on each side thereof. This enables the head to be mounted upon supporting walls having a wide variety of surface configurations, with the mounting strip being effective to hold the head in any desired angular position relative to the wall.

Figs. 1 and 2 show a typical control head 10 of a type commonly used in mobile communication equipment, mounted upon a plane supporting wall 12. Fig. 3 shows the control head 10 mounted upon a concave wall 14, while Fig. 4 illustrates the control head 10 mounted upon a convex wall 16. Usually the supporting wall constitutes the dash of a motor vehicle, although the invention is not necessarily limited to such application.

The control head 10 has a plane face 18 and a convex face 20. The head 10 is adapted to be supported with the face 18 thereof in a predetermined position, for example, vertical. Various instrumentalities are disposed on the face 18, such as a squelch control knob 22, a volume control knob 24 (which also actuates an off-on switch), a frequency selector switch 26, and indicator lights 28 and 30. The convex face 20 is an approximately semi-cylindrical surface which is bounded at opposite ends thereof by end plates 32 of approximately semi-circular configuration.

Each end plate 32 has a swivel connection with a supporting arm or post 34. As shown in the drawings, the arms 34 pivot on the end plates 32 about an axis substantially coinciding with the geometrical center of the cylindrical surface 20. The arms 34 are hollow and have threaded extremities which extend through apertures in the supporting wall 12. Usually a backing plate 36 is employed behind the wall 12, and the threaded parts of the posts 34 extend through openings in this plate 36. If the supporting wall 12 is very thick, the backing plate 36 may be dispensed with. Sleeve nuts 38 are threaded onto the posts 34 behind the wall 12, and when these nuts 38 are tightened, the head 10 is drawn toward the wall 12. Rubber grommets 40 disposed on the arms 34 seal the openings in the wall 12 through which these arms extend.

Electrical connections between the control head 10 and the other components of the communication equipment are established through conductors in cables 42 and 44, Fig. 1, which lead into the hollow arms 34. Cable clamps 46 are secured to the cables 42 and 44 and are held in place by the sleeve nuts 38. The conductors are so arranged as to permit a certain amount of swivel motion of the head 10. The head 10 turns on bearings afforded by the ends of the arms 34 at their junctures with the end plates 32.

In the normal use of the communication equipment, the head 10 may be subjected to a great deal of vibration or other mechanical stress. Inasmuch as both the head 10 and the supporting wall 12 have relatively smooth, hard surfaces, there would not be a great deal of friction between them if the head 10 were clamped directly against the wall 12. Hence, the head 10 would tend to turn relative to the wall 12. To prevent this, a resilient mounting strip 50, made of suitable material such as rubber or neoprene, is interposed between the convex face 20 of the head 10 and the adjoining face of the wall 12, and the head 10 is clamped against this mounting strip 50 rather than against the wall 12.

As shown best in Figs. 2 and 5, the mounting strip 50 is approximately dumbbell-shaped in cross section, having enlarged edge or shoulder portions 52 extending longitudinally of the strip 50. The shoulder portions 52 are adapted to contact and grip the convex face 20 of the head 10 and the opposed surface of the wall 12. In practice, the strip 50 is made approximately one inch wide, and the maximum thickness of the strip 50, at the shoulders 52, is $\frac{7}{32}$ of an inch. The central concave portion 54 of the strip 50, which intervenes between the edge or shoulder portions 52, is about $\frac{1}{16}$ of an inch thick at its narrowest point. The radius of curvature of this thin section 54 is about $\frac{7}{8}$ inch. This is substantially smaller than the radius of the convex face 20, which is approximately 1½ inches. It is likewise smaller than the least expected radius of the supporting wall, such as the wall 16 (Fig. 4). Consequently, the shoulders 52 afford two distinct points of gripping contact with the convex face 20, and likewise two distinct points of gripping contact with the surface of the supporting wall, with a slight gap existing between the thin center portion 54 and the intervening parts of these surfaces. The material of the mounting strip 50 is sufficiently stiff so that the shoulders 52 are not appreciably deformed when they are clamped between the head 10 and the supporting wall.

The mounting strip 50 enables control heads such as 10 to be supported in desired angular positions with respect to walls of various configurations, such as the plane wall 12, the concave wall 14 or the convex wall 16. Thus, any tendency of the head 10 to turn on its axis due to vibration or the like is very effectively eliminated. The configuration of the mounting strip 50 can, of course, be modified to suit individual needs. The essential characteristic of this mounting strip is that it provides two distinct, spaced points of gripping contact with each of the opposed surfaces, instead of a substantially single-line contact between these surfaces as formerly was the case.

Fig. 6 illustrates a speaker head 60 having substantially the same configuration as the control head 10, with a vertical front face 62 and a convex rear face 64. A loudspeaker 64 is disposed behind the front face 62 in registry with a grilled opening 66 in this face. Both a control head and a speaker head may be included in the same communication system, or they may be used separately under different circumstances. A mounting strip such as 50, Fig. 5, is used in conjunction with the speaker head 60 in the same manner as explained previously in connection with the control head 10.

While there has been described what is at present considered to be the preferred embodiment of the invention, it will be understood that various modifications may be made therein which are within the true spirit and scope of the invention as defined in the appended claims.

I claim:

1. Apparatus for mounting a first member on a second member wherein one of the members has a convex cylindrical face portion opposed to a face portion of the other member, said apparatus including, supporting means pivotally connected to said one member along an axis substantially coinciding with the geometrical axis of said cylindrical face portion and supported on said other member, and an elongated resilient mounting strip positioned between the cylindrical face portion of the one member and the opposed face portion of the other member, said strip having thick gripping portions engaging the opposed face portions and a thin intervening portion, said supporting means being adjustable in a direction substantially perpendicular to said pivotal axis for drawing the opposed face portions toward each other so that said gripping portions are compressed and frictionally engage the face portions of the members to restrain said one member from turning relative to said other member.

2. Apparatus for mounting a first member having a cylindrical face portion on a second member including in combination, supporting means pivotally connected to the first member on an axis substantially coinciding with the geometrical axis of said cylindrical face portion and adjustably supported on the second member, and an elongated resilient mounting strip positioned between the opposed face portions of the members, said strip having thick gripping portions engaging the opposed faces and a thin intervening portion, said supporting means being adjustable with respect to the second member in a direction substantially perpendicular to said pivotal axis for drawing the opposed face portions toward each other, whereby the first member may be mounted at various positions with respect to the second member and is resiliently held in a given position by said mounting strip.

3. Apparatus for mounting a control head having a convex cylindrical face portion on a supporting member including in combination, supporting means pivotally connected to the control head on an axis substantially coinciding with the geometrical axis of said cylindrical face portion and adjustably mounted on the supporting member, and an elongated resilient mounting strip positioned between the cylindrical face portion of the control head and the opposed face of the supporting member, said strip having thick gripping portions engaging the opposed faces and a thin intervening portion, said supporting means being adjustable with respect to the supporting member in a direction substantially perpendicular to said pivotal axis for drawing the opposed faces toward each other so that said gripping portions are compressed and frictionally engage the opposed faces to restrain movement of the control head relative to the supporting member.

4. The combination including, a control head, a supporting member, and means for mounting said control head on said supporting member, said control head and said supporting member having opposed faces with the opposed face of said control head having a convex cylindrical surface, said mounting means including at least one mounting portion pivotally connected to said control head along an axis coinciding with the geometrical axis of said cylindrical surface and adjustably connected to said supporting member, said mounting portion being adjustable along a line perpendicular to said geometrical axis, and a resilient mounting strip interposed between said opposed faces of said control head and said supporting member, said strip having a dumbbell-shaped cross section with enlarged edge portions engaging said opposed faces and an intervening thin portion which clears said opposed faces, said mounting portion holding said opposed faces at such spacing that said edge portions are compressed to provide frictional engagement between said mounting strip and said faces along two spaced lines.

5. Mobile radio equipment including in combination a control head having electrical connections thereto, and means for mounting said control head on a portion of a vehicle, said control head having a convex cylindrical face adapted to be positioned in opposed relation to the portion of the vehicle on which the control head is mounted, said mounting means including at least one tubular mounting portion pivotally connected to said control head along an axis substantially coinciding with the geometrical axis of said cylindrical face portion and adjustably supported on said vehicle portion, and a resilient mounting strip interposed between said cylindrical face of said control head and the opposed face of the vehicle portion, said strip having enlarged edge portions engaging said opposed faces and a thin intervening portion, said tubular mounting portion forming a conduit for electrical connections to said control head, said mounting portion supporting said control head at various angular positions with respect to the vehicle portion and being adjustable in a direction substantially perpendicular to said pivotal axis to hold said cylindrical face portion of said control head at such spacing with respect to the vehicle portion that said edge portions of said mounting strip are compressed to provide a resilient support for said control head which restrains movement thereof.

CHARLES E. BECK.

References Cited in the file of this patent

UNITED STATES PATENTS

| Number | Name | Date |
|--------|------|------|
| 807,613 | Graves | Dec. 19, 1905 |
| 875,270 | Irish | Dec. 31, 1907 |
| 1,416,664 | Healy et al. | May 16, 1922 |
| 1,667,741 | Roth | May 1, 1928 |
| 1,678,438 | Leland | July 24, 1928 |
| 1,980,005 | Seeger et al. | Nov. 6, 1934 |
| 2,295,666 | King | Sept. 15, 1942 |

FOREIGN PATENTS

| Number | Country | Date |
|--------|---------|------|
| 415,235 | France | Sept. 21, 1910 |
| 485,484 | Great Britain | May 20, 1938 |